(12) United States Patent
Weintraub et al.

(10) Patent No.: US 9,930,879 B2
(45) Date of Patent: Apr. 3, 2018

(54) PACKAGING CUE SYSTEM FOR CONSUMER PRODUCTS

(71) Applicant: S.C. Johnson & Son, Inc., Racine, WI (US)

(72) Inventors: Gary D. Weintraub, Chicago, IL (US); Lynn Templeton, Racine, WI (US)

(73) Assignee: S.C. JOHNSON & SON, INC., Racine, WI (US)

( * ) Notice: Subject to any disclaimer, the term of this patent is extended or adjusted under 35 U.S.C. 154(b) by 635 days.

(21) Appl. No.: 14/305,867

(22) Filed: Jun. 16, 2014

(65) Prior Publication Data
US 2015/0027034 A1 Jan. 29, 2015

Related U.S. Application Data

(60) Provisional application No. 61/859,104, filed on Jul. 26, 2013.

(51) Int. Cl.
| | |
|---|---|
| *G09F 23/00* | (2006.01) |
| *G09F 23/10* | (2006.01) |
| *A01M 7/00* | (2006.01) |
| *B65D 25/20* | (2006.01) |
| *B65B 61/26* | (2006.01) |
| *G09F 3/10* | (2006.01) |
| *G09F 3/02* | (2006.01) |

(52) U.S. Cl.
CPC ............ *A01M 7/00* (2013.01); *B65B 61/26* (2013.01); *B65D 25/205* (2013.01); *G09F 3/10* (2013.01); *G09F 23/00* (2013.01); *G09F 23/10* (2013.01); *A01M 2200/01* (2013.01); *G09F 2003/0216* (2013.01); *G09F 2003/0272* (2013.01)

(58) Field of Classification Search
CPC .................................. G09F 23/10; G09F 23/00
USPC ................................ 283/56, 115; D20/33, 37
See application file for complete search history.

(56) References Cited

U.S. PATENT DOCUMENTS

| | | | |
|---|---|---|---|
| 4,882,873 A | 11/1989 | Purnell | |
| 6,042,151 A * | 3/2000 | Ali | B42D 15/00 |
| | | | 283/115 |
| 6,454,095 B1 * | 9/2002 | Brisebois | A61F 13/551 |
| | | | 206/440 |

(Continued)

FOREIGN PATENT DOCUMENTS

| | | |
|---|---|---|
| EM | 000019690-0005 A1 | 4/2003 |
| EM | 000049390-0001 A1 | 7/2003 |

(Continued)

OTHER PUBLICATIONS

PCT/US2014/047848 International Search Report and Written Opinion dated Nov. 17, 2014.

(Continued)

*Primary Examiner* — Kyle Grabowski

(57) ABSTRACT

A visual cue system associated with a plurality of consumer product packages includes a first visual cue with at least a first symbol and first text associated therewith and is further associated with a first consumer product. A second visual cue has at least a second symbol and second text associated therewith and is further associated with a second consumer product. A regimen key is associated with at least one of the first or second consumer products. Further, the first and second consumer product packages are different.

20 Claims, 13 Drawing Sheets

(56) References Cited

U.S. PATENT DOCUMENTS

| | | | |
|---|---|---|---|
| D485,311 S | 1/2004 | Kosek | |
| D517,122 S | 3/2006 | Milliorn | |
| D541,874 S | 5/2007 | Turner et al. | |
| 7,212,129 B2 | 5/2007 | Barber et al. | |
| 7,275,042 B1 | 5/2007 | Kelly et al. | |
| D588,029 S | 3/2009 | Nakatsubo et al. | |
| D593,160 S | 5/2009 | Weber | |
| 7,572,249 B2* | 8/2009 | Betts | G09F 23/00 206/438 |
| D621,880 S | 8/2010 | Langan et al. | |
| D647,794 S | 11/2011 | Anderson et al. | |
| 8,139,858 B1 | 3/2012 | Landwehr et al. | |
| D668,961 S | 10/2012 | Bellvehi | |
| 2005/0065492 A1* | 3/2005 | Cole | A61F 13/15577 604/385.01 |
| 2008/0157990 A1 | 7/2008 | Belzer et al. | |
| 2008/0283426 A1 | 11/2008 | Primer et al. | |
| 2009/0005247 A1 | 1/2009 | Spiegel et al. | |
| 2010/0025981 A1* | 2/2010 | Lay | B42D 15/00 283/115 |
| 2010/0252474 A1 | 10/2010 | Miceli et al. | |
| 2011/0035246 A1 | 2/2011 | Fithian et al. | |
| 2012/0000592 A1 | 1/2012 | Mase et al. | |
| 2012/0042563 A1 | 2/2012 | Anderson | |
| 2012/0198754 A1 | 8/2012 | Tarnower | |

FOREIGN PATENT DOCUMENTS

| | | |
|---|---|---|
| EM | 000049390-0002 A1 | 7/2003 |
| EM | 000052485-0007 A1 | 7/2003 |
| EM | 000052485-0008 A1 | 7/2003 |
| EM | 000090584-0002 A1 | 10/2003 |
| EM | 000222542-0001 A1 | 9/2004 |
| EM | 000246715-0001 A1 | 10/2004 |
| EM | 000286539-0018 A1 | 1/2005 |
| EM | 000294483-0001 A1 | 2/2005 |
| EM | 000294483-0002 A1 | 2/2005 |
| EM | 000296421-0003 A1 | 2/2005 |
| EM | 000428024-0031 A1 | 11/2005 |
| EM | 000484225-0015 A1 | 2/2006 |
| EM | 000589809-0005 A1 | 9/2006 |
| EM | 000636147-0105 A1 | 11/2006 |
| EM | 000790472-0009 A1 | 9/2007 |
| EM | 000910807-0008 A1 | 4/2008 |
| EM | 002081711-0008 A1 | 4/2008 |
| EM | 001050173-0154 A1 | 11/2008 |
| EM | 001120935-0001 A1 | 4/2009 |
| EM | 002010652-000 A1 | 3/2012 |
| EM | 002013680-0013 A1 | 3/2012 |
| EM | 0002043190-0014 A1 | 5/2012 |
| EM | 001050173-0170 A1 | 11/2013 |
| EP | 1855264 A2 | 11/2007 |
| JP | D1462176 S | 2/2013 |
| SE | 82276 | 4/2013 |
| WO | WO2/063593 A2 | 8/2002 |
| WO | DM070873 | 10/2008 |
| WO | DM075922 | 4/2011 |

OTHER PUBLICATIONS

Office Action issued in Australian Patent Application No. 2014293111, dated Jun. 29, 2016, 5 pages.

* cited by examiner

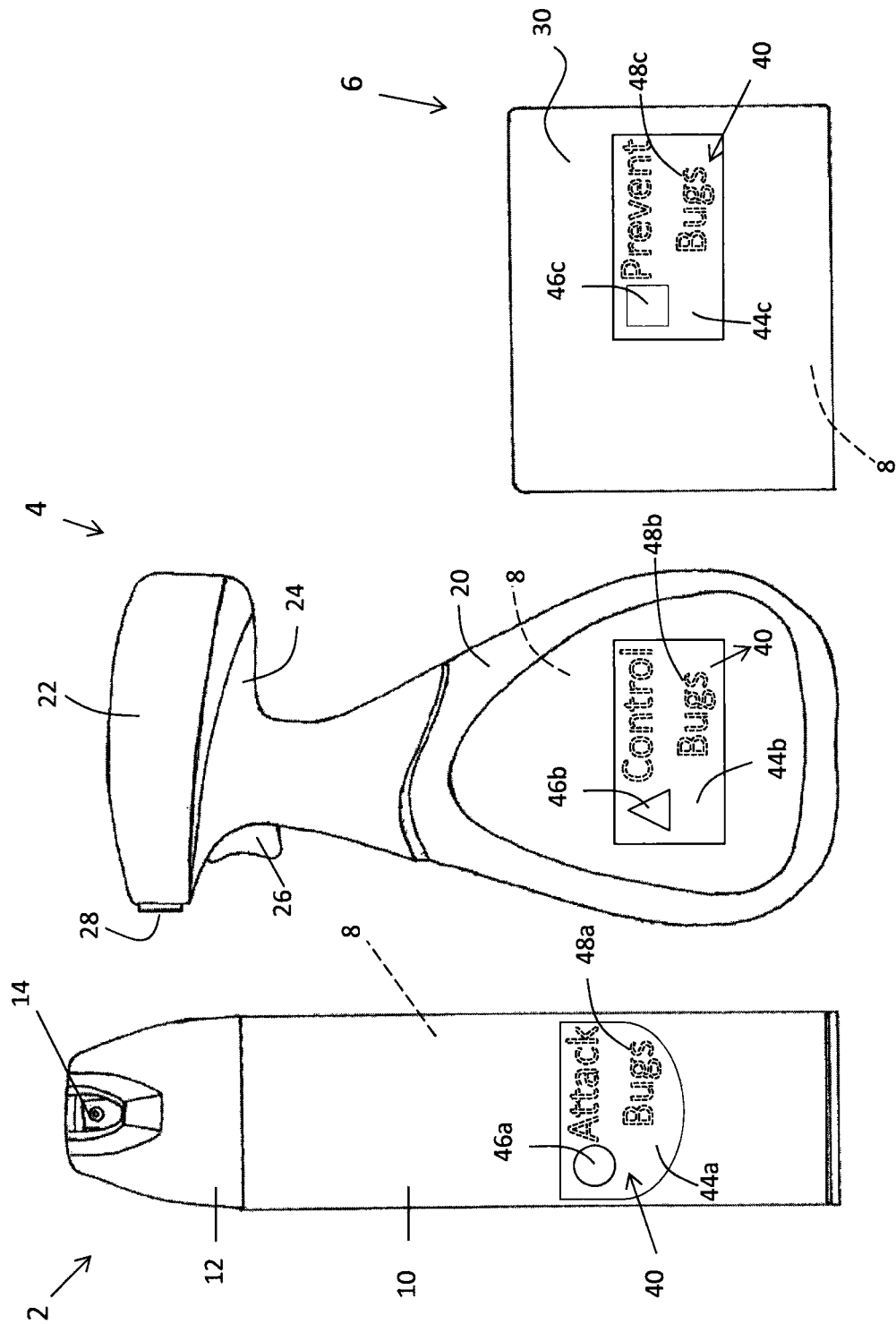

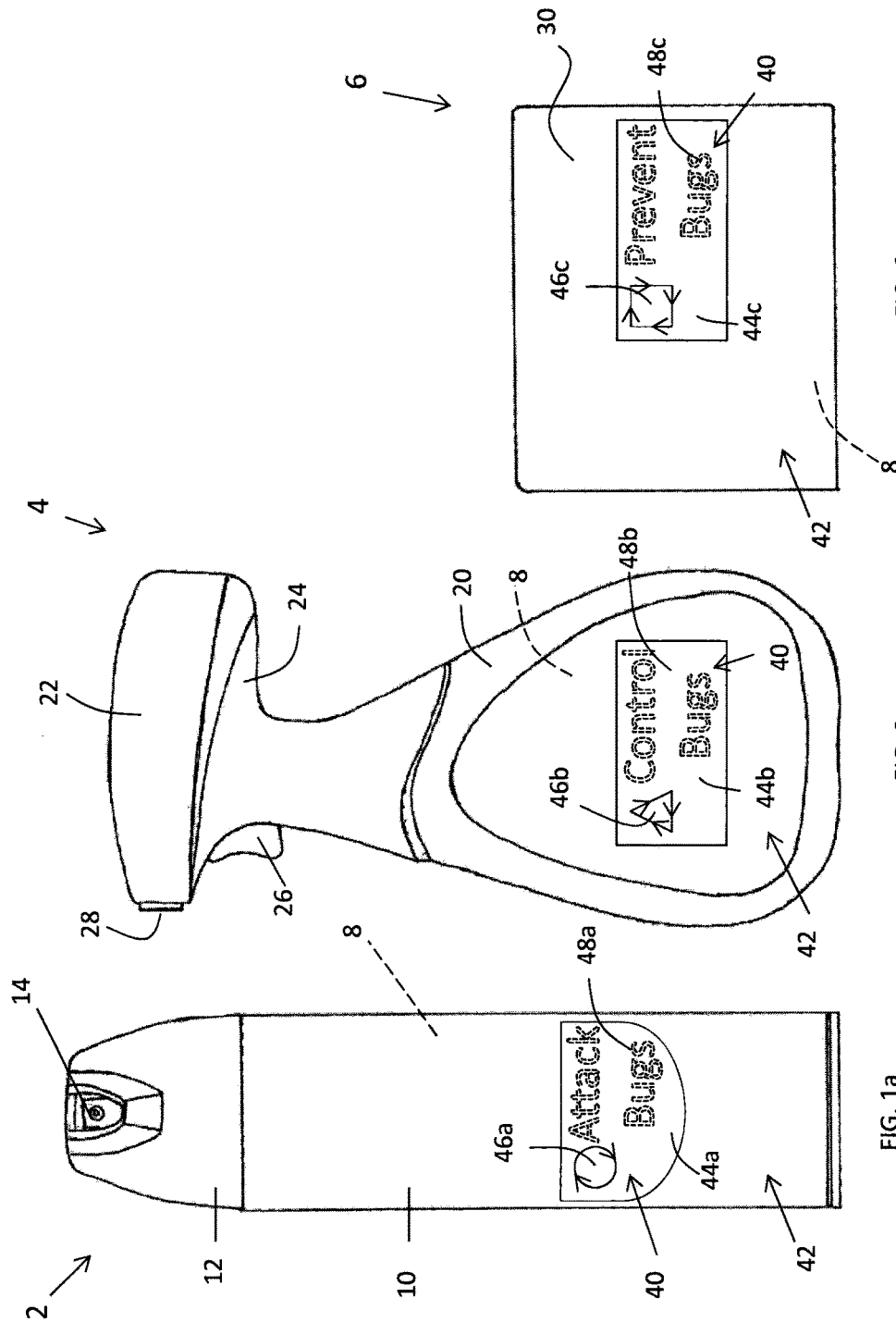

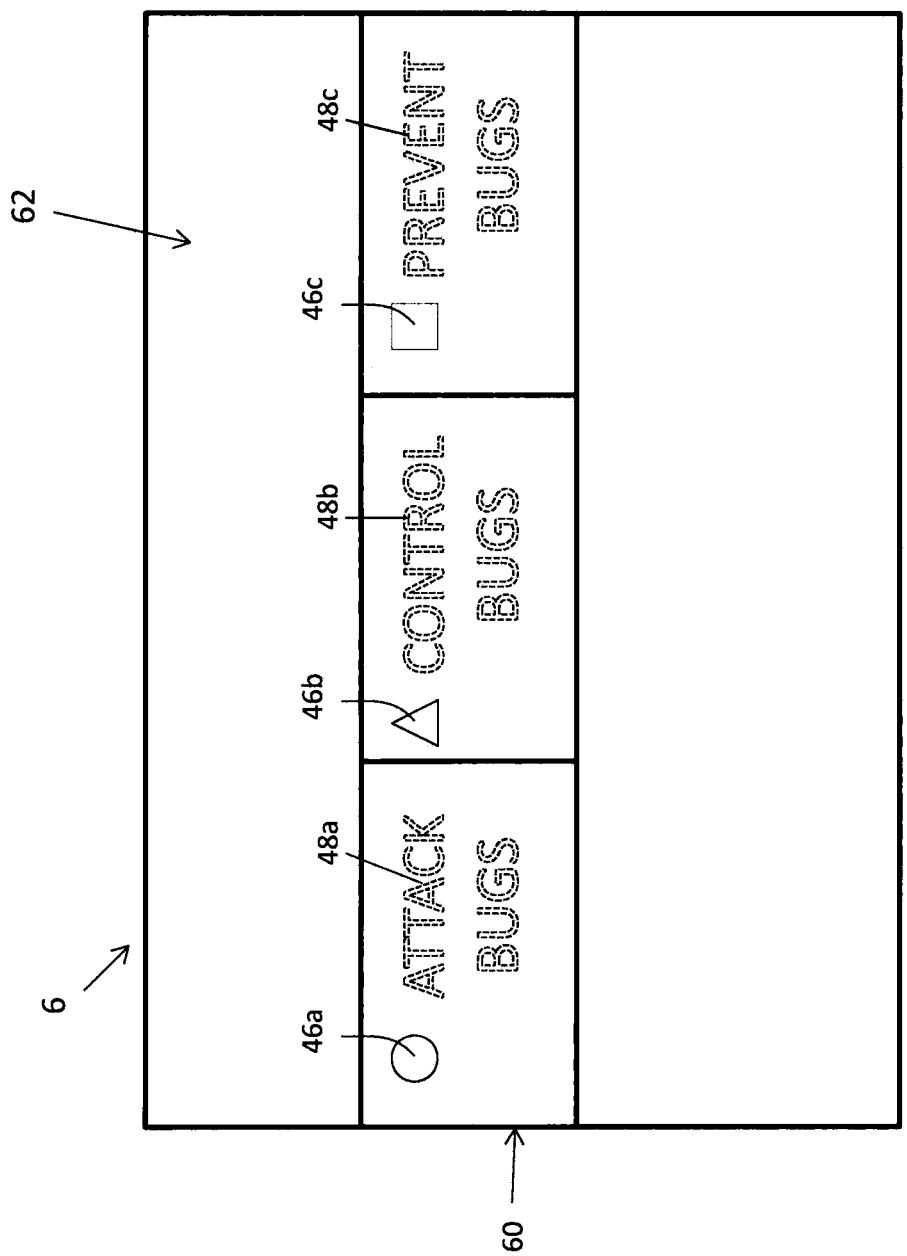

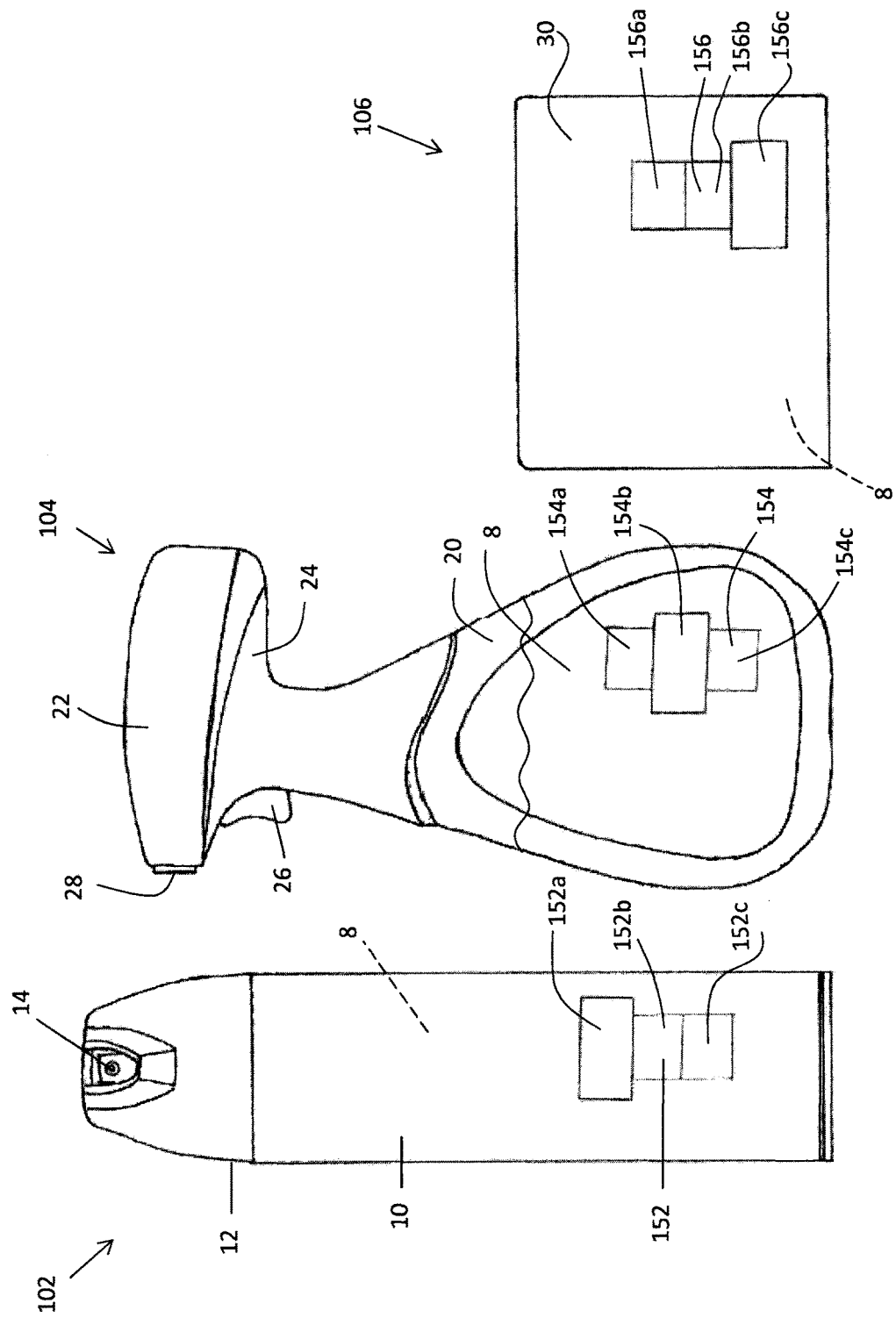

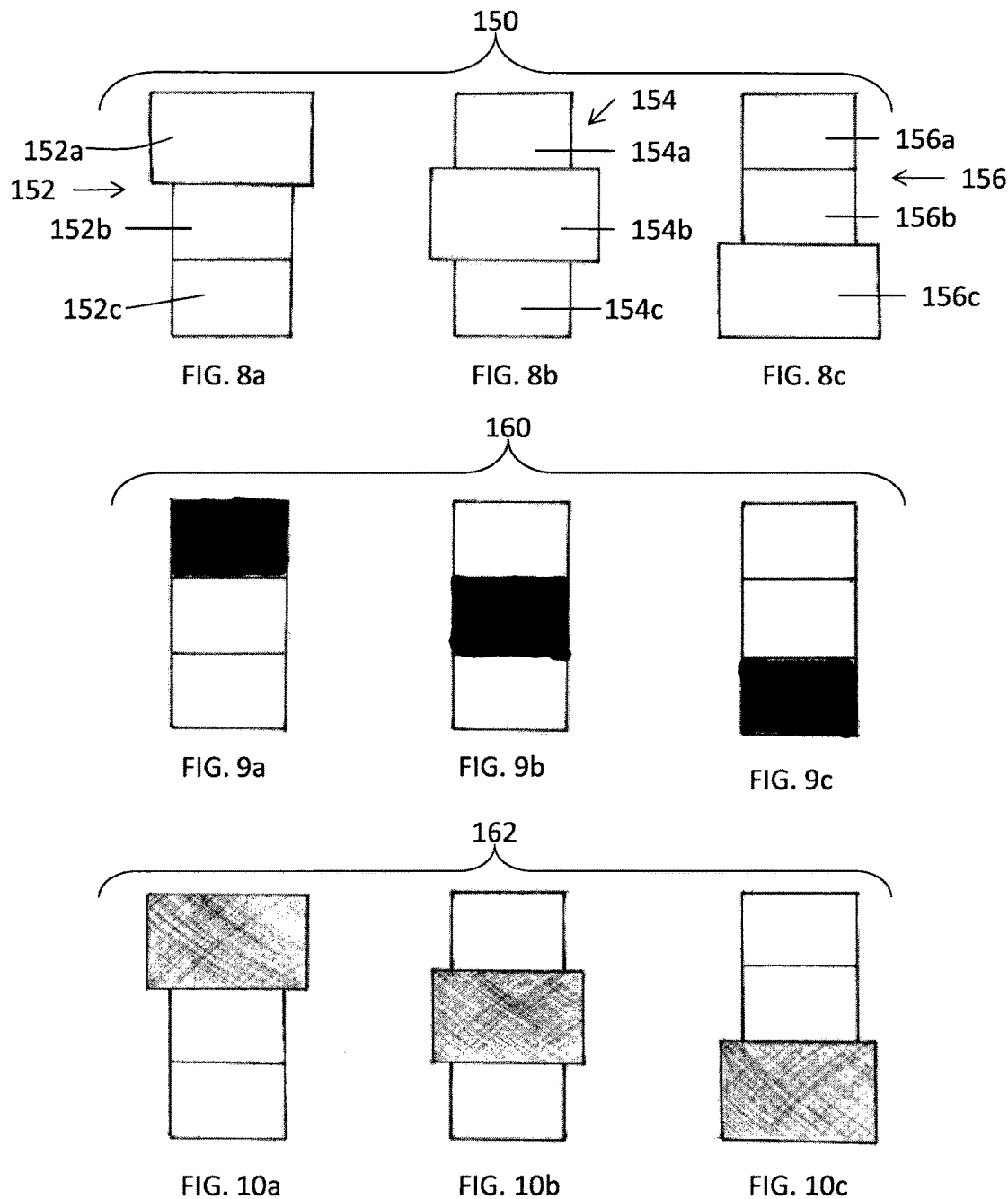

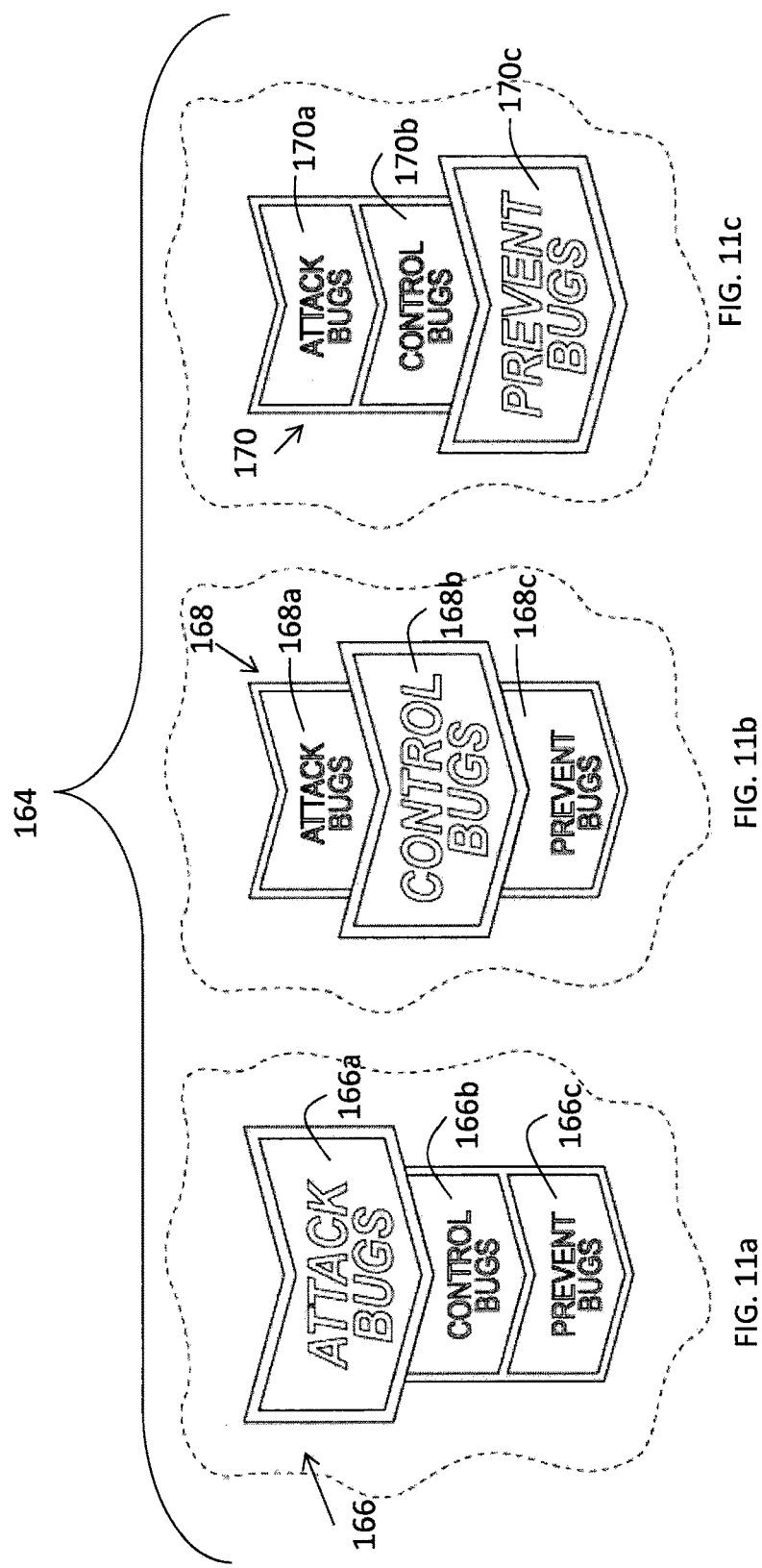

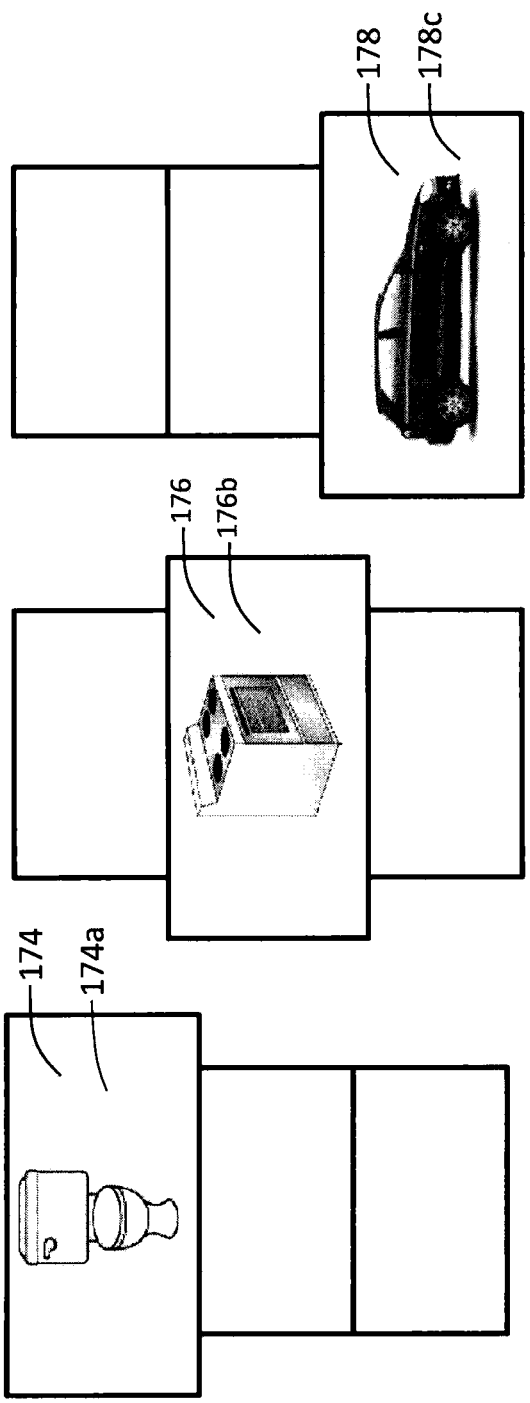

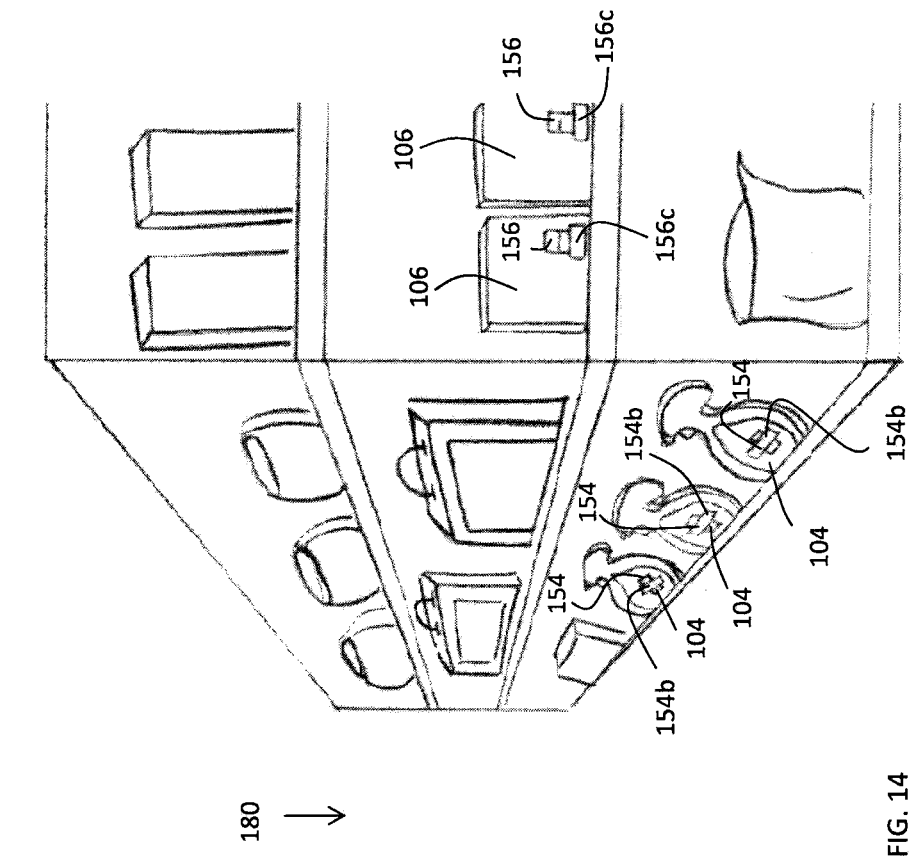
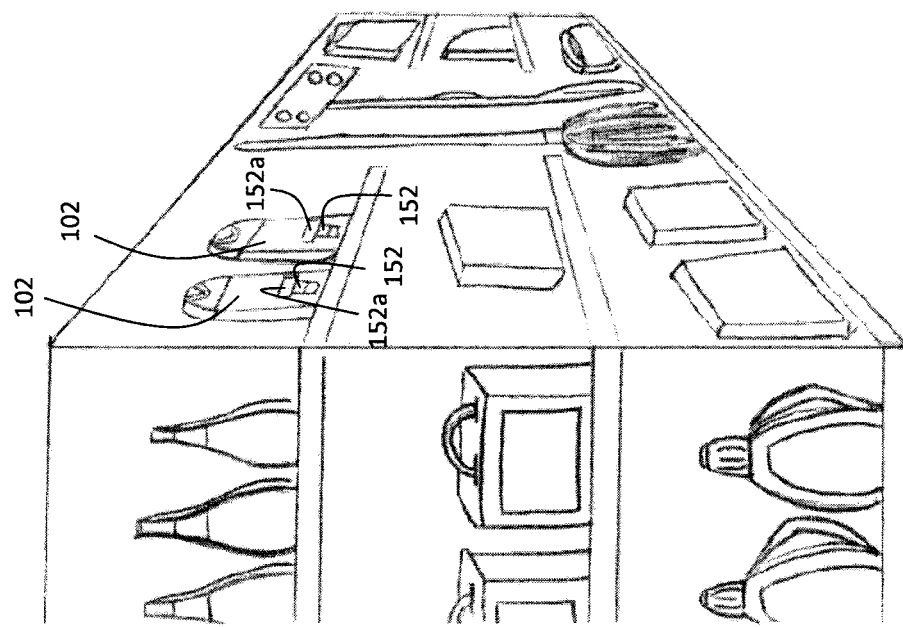
FIG. 14

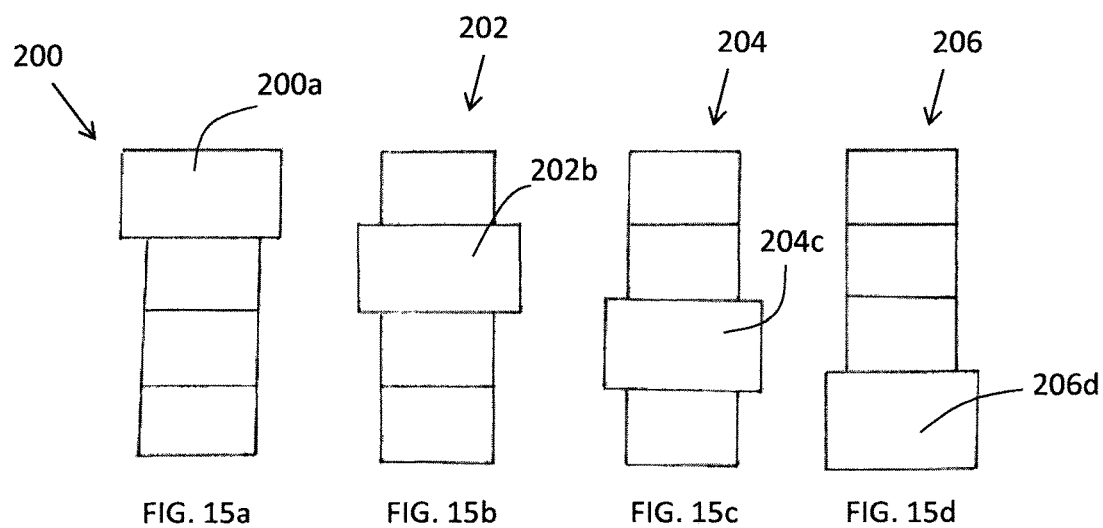
FIG. 15a  FIG. 15b  FIG. 15c  FIG. 15d
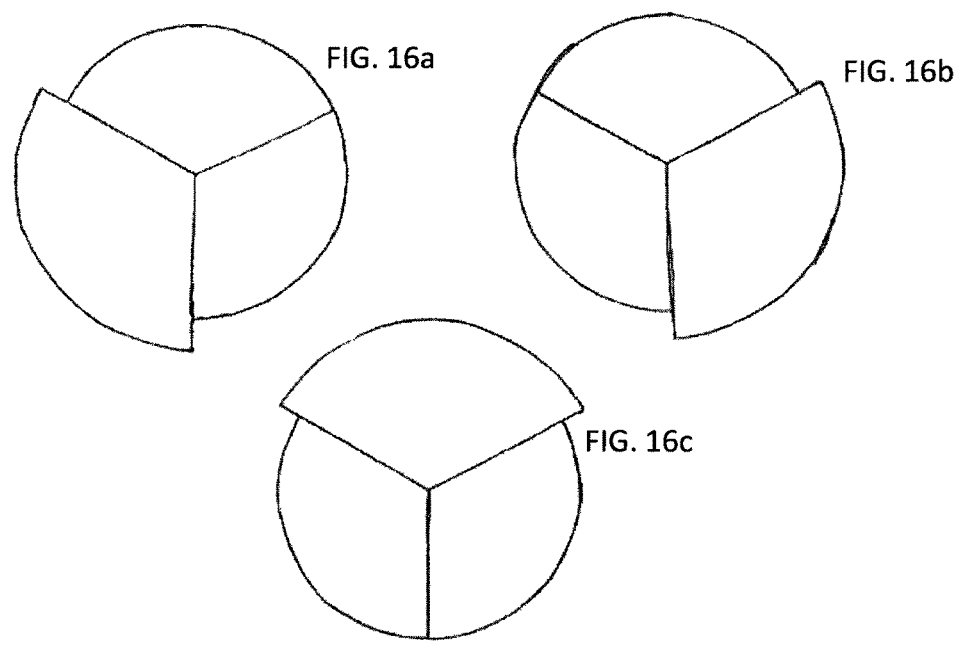

PACKAGING CUE SYSTEM FOR CONSUMER PRODUCTS

CROSS REFERENCE TO RELATED APPLICATIONS

Not applicable.

REFERENCE REGARDING FEDERALLY SPONSORED RESEARCH OR DEVELOPMENT

Not applicable.

SEQUENTIAL LISTING

Not applicable.

BACKGROUND OF THE DISCLOSURE

1. Field of the Disclosure

The present invention is directed to a packaging cue system that facilitates a consumer's identification and selection of a plurality of consumer products associated with one or more treatment regimens.

2. Description of the Background of the Disclosure

In our increasingly complex and busy world, consumers have many needs regarding upkeep of their homes and businesses, including cleaning, controlling pests, and fragrancing the air. It is common for consumers to use consumer products to assist in accomplishing one or more of these tasks. However, today's consumers are often overwhelmed by the number of consumer products available to them and are unsure about which product would be the most useful for the specific task at hand. Additionally, most consumers are unaware that it is desirable to use at least two, and often more, consumer products together, i.e., a regimen, to achieve a desired outcome or to enhance that outcome. For example, a consumer may be unaware that it is desirable to combine air fragrancing products that are specifically designed for certain rooms of the house (e.g., the kitchen, bathroom, garage, etc.), or to combine fragrancing products with odor eliminating products to effectively fragrance and/or deodorize their homes. When cleaning, a consumer may find it beneficial to combine products that clean, with products that disinfect and shine to enhance the overall cleanliness of their homes.

One household task that would benefit greatly from a product regimen is pest control. Many consumers are worried about using too many pest control products in the home and do not realize that pests could be controlled more effectively and with less active ingredients if the right regimen of products were used. In one example, the regimen of pest control products may include products that attack bugs, products that control bugs, and products that prevent bugs. These products can more effectively control pests in the home when used together. However, many consumers are unaware that these products can be used together.

In all of these non-limiting examples, a single manufacturer, or in other instances a group of manufacturers, may supply the entire stream of consumer products in the regimen for completing a task. However, each consumer product is, in and of itself, a distinct and separate product that provides a utilitarian function and is not substantively connected with the other products except for the fact that it is (or may be) used during the same regimen. As such, many of the consumer products capable of being used in the same regimen are often found on different areas of a store shelf, different shelves, or even in different areas of the store. Thus, consumers often do not realize that certain products can and should be used together to achieve a desired outcome and it is difficult for consumers to locate various products capable of being used together in a regimen.

One way to inform consumers about consumer product regimens is to provide digital media advertisements that explain the regimen to the consumers. Unfortunately, digital advertising such as television commercials are very expensive and do not always reach the targeted consumers. Moreover, digital media and advertisements are not always present at the point of sale when the consumers need the information to make an informed decision about choosing a product or a regimen. A solution to educating consumers at the point of sale is providing in-store displays and advertisements. However, many stores will not allow manufacturers to place large displays in the stores.

Thus, there is a need in the art to facilitate consumer selection of products at the point of purchase (either in store or on-line) to better meet the consumer's needs.

SUMMARY OF THE INVENTION

According to one embodiment, a visual cue system associated with a plurality of consumer product packages includes a first visual cue with at least a first symbol and first text associated therewith, which is further associated with a first consumer product. A second visual cue has at least a second symbol and second text associated therewith, which is further associated with a second consumer product. A regimen key is associated with at least one of the first or second consumer products. Further, the first and second consumer product packages are different.

The visual cue system may also include the first symbol and the first text associated therewith being affixed to at least one of the first consumer product or a package containing the first consumer product. Further, the second symbol and the second text associated therewith may be affixed to at least one of the second consumer product or a package containing the second consumer product. Further, the regimen key may be disposed on at least one of the first or second consumer products or packages containing the first or second consumer products. It is also contemplated that the first visual cue and the second visual cue are disposed on a front surface of the first and second consumer products or packages containing the consumer products, respectively. Further, it is also contemplated that the regimen key is disposed on a rear surface of at least one of the first and second consumer products or packages containing the products. Still further, it is also contemplated that the first visual cue and the second visual cue are disposed on a front surface of the first and second consumer products or packages containing the consumer products, respectively, and that the regimen key is disposed on the rear surface of both of the first and the second consumer products or packages containing the consumer products.

The visual cue system may also utilize the first symbol and the second symbol in the regimen key. Further, the first text and the second text may be utilized in the regimen key. Also, it is contemplated that the first symbol of the first visual cue may include a graphic associated with a function of the first consumer product. Still further, the second symbol of the second visual cue may include a graphic different than the graphic on the first symbol of the first visual cue, which is associated with a function of the second consumer product.

It is also envisioned that a third visual cue having at least a third symbol and third text associated therewith may be associated with a third consumer product. In this embodiment, the third consumer product is different than the first and second consumer products. Further, the regimen key may be disposed on the first, second, and third consumer products or consumer product packages.

It is also anticipated that the first and second visual cues of the visual cue system may be provided in a digital medium.

According to another embodiment, a visual cue system is associated with a plurality of consumer product packages. A first visual cue has at least a first section and a second section disposed adjacent to each other with similarly defined geometric shapes. The first visual cue is affixed to a first consumer product package. A second visual cue has at least a first section and a second section disposed adjacent to each other with similarly defined geometric shapes. The second visual cue is affixed to a second consumer product package. The first and second consumer product packages are different. Further, the defined geometric shapes of the first and second visual cues are identical. Also, the first section of the first visual cue is larger than the second section thereof and the second section of the second visual cue is larger than the first section thereof.

In some embodiments, the first and second sections of the first and second visual cues are disposed adjacent one another in a serial manner. In other embodiments, the first and second visual cues include first, second, and third sections disposed adjacent to one another with similarly defined geometric shapes, wherein the first section of the first visual cue is larger than the second and third sections thereof and the second section of the second visual cue is larger than the first and third sections thereof.

In additional embodiments, a third visual cue having a first section, a second section, and a third section with similarly defined geometric shapes is affixed to a third consumer product package that is different than the first and second consumer product packages, wherein the defined geometric shapes of the third visual cue is identical to those of the first and second visual cues, and wherein the third section of the third visual cue is larger than the first and second sections thereof.

In some embodiments, the first, second, and third sections of the first, second, and third visual cues are disposed adjacent one another in a serial manner. In other embodiments, the first, second, and third sections of the first, second, and third visual cues, each correspond to an upper section, a middle section, and a lower section, respectively. In additional embodiments, the first visual cue and the second visual cue are each associated with a front surface of the first consumer product package and the second consumer product package, respectively.

In some embodiments, the ratio of the size of the first section of the first visual cue to the second section thereof is at least about 1.25 to 1. In other embodiments, the ratio of the size of the second section of the second visual cue to the first section thereof is at least about 1.25 to 1.

In further embodiments, the first section of the first visual cue comprises a first color and the second section thereof comprises a different color. In additional embodiments, the second section of the second visual cue comprises the same color as the first section of the first visual cue, wherein the first section of the second visual cue is a different color than the second section thereof. In yet other embodiments, the first section of the first visual cue comprises the color yellow and the second section thereof comprises the color black. In other embodiments, the second section of the second visual cue comprises the color yellow and the first section thereof comprises the color black.

In additional embodiments, the first section of the first visual cue includes a graphic associated with a function of the first consumer product package. In other embodiments, the second section of the second visual cue includes a graphic different than the graphic on the first section of the first visual cue, which is associated with a function of the second consumer product package.

According to another embodiment, a pest management regimen includes a first consumer product package for attacking bugs having a first visual cue thereon, a second consumer product package for controlling bugs having a second visual cue thereon, and a third consumer product package for preventing bugs having a third visual cue thereon. The first, second, and third visual cues are associated with each other visually to provide an indication that the first, second, and third consumer product packages are designed to be used together as part of the pest management regimen.

It is also envisioned that such a pest management regimen may include a regimen key that is provided on at least one of the first, second, and third consumer product packages. Further, the regimen key may be provided on all of the first, second, and third consumer product packages. Still further, the first, second, and third visual cues may include a first, second, and third symbol, respectively. The first, second, and third visual cues may further include associated text therewith. It is also anticipated that one of the first, second, and third visual cues may have a size larger than the other remaining visual cues. Further, the one of the first, second, and third visual cues having a greater size may be further provided with a color different then the other remaining visual cues.

In some embodiments, the first, second, and third visual cues have first, second and third sections provided serially adjacent one another with similarly defined geometric shapes, wherein the first section of the first visual cue, the second section of the second visual cue, and the third section of the third visual cue are larger than the other respective sections comprising the first, second, and third visual cues. In other embodiments, the first section of the first visual cue, the second section of the second visual cue, and the third section of the third visual cue are provided with the same color, which is different than the other respective sections comprising the first, second, and third visual cues.

According to still another embodiment, a method for providing consumer product packages associated with a regimen includes the step of providing a first consumer product package having a first visual cue disposed thereon, wherein a first product therein is adapted to perform a first function. Another step includes providing a second consumer product package having a second visual cue disposed thereon, wherein a second product therein is adapted to perform a second, different function. A different step includes providing a regimen key on surfaces of the first and second consumer product packages illustrating at least a portion of both the first and second visual cues.

It is also envisioned that a further step to a method for providing consumer product packages associated with a regimen may include providing a third consumer product package having a third visual cue disposed thereon, wherein a third product therein is adapted to perform a third, different function. Further, another step may include the provision of the regimen key on surfaces of the third consumer product package illustrating at least a portion of the first, second, and third visual cues.

The above and other aspects of the present invention will be apparent from the following description of the preferred embodiments of the invention and from the accompanying drawings.

BRIEF DESCRIPTION OF THE DRAWINGS

FIGS. 1-3 are front elevational views of first, second and third consumer products having packaging with first, second and third visual cues associated therewith, respectively, that define one embodiment of a regimen;

FIGS. 1A-3A are front elevational views of first, second and third consumer products having packaging with first, second and third visual cues associated therewith, respectively, that define another embodiment of a regimen;

FIG. 4 is a rear elevational view of one of the consumer products of FIGS. 1-3 having a key disposed on a surface thereof;

FIGS. 5-7 are front elevational views of first, second and third consumer products having packaging with first, second and third visual cues associated therewith, respectively, that define yet another embodiment of a regimen;

FIGS. 8A-8C depict schematic views of a visual cue system comprising a first visual cue, a second visual cue, and a third visual cue;

FIGS. 9A-9C depict schematic views of another embodiment of a visual cue system comprising a first visual cue, a second visual cue, and a third visual cue;

FIGS. 10A-10C depict schematic views of a different embodiment of a visual cue system comprising a first visual cue, a second visual cue, and a third visual cue;

FIGS. 11A-11C depict schematic views of a different embodiment of a visual cue system comprising a first visual cue, a second visual cue, and a third visual cue;

FIGS. 12A-12C depict schematic views of yet a different embodiment of a visual cue system comprising a first visual cue, a second visual cue, and a third visual cue and further including a secondary visual cue system;

FIG. 14 is a perspective view of an aisle in a store, wherein the consumer product of FIG. 5 is disposed on one side of the aisle, the consumer product of FIG. 6 is disposed on an opposing side of the aisle, and the consumer product of FIG. 7 is disposed on an endcap of the aisle;

FIGS. 15A-15D show schematic views of another embodiment of a visual cue system comprising a first visual cue, a second visual cue, a third visual cue, and a fourth visual cue;

FIGS. 16A-16C depict schematic views of a different embodiment of a generally pie-shaped visual cue system comprising a first visual cue, a second visual cue, and a third visual cue.

DETAILED DESCRIPTION OF THE DRAWINGS

Figure 4A:
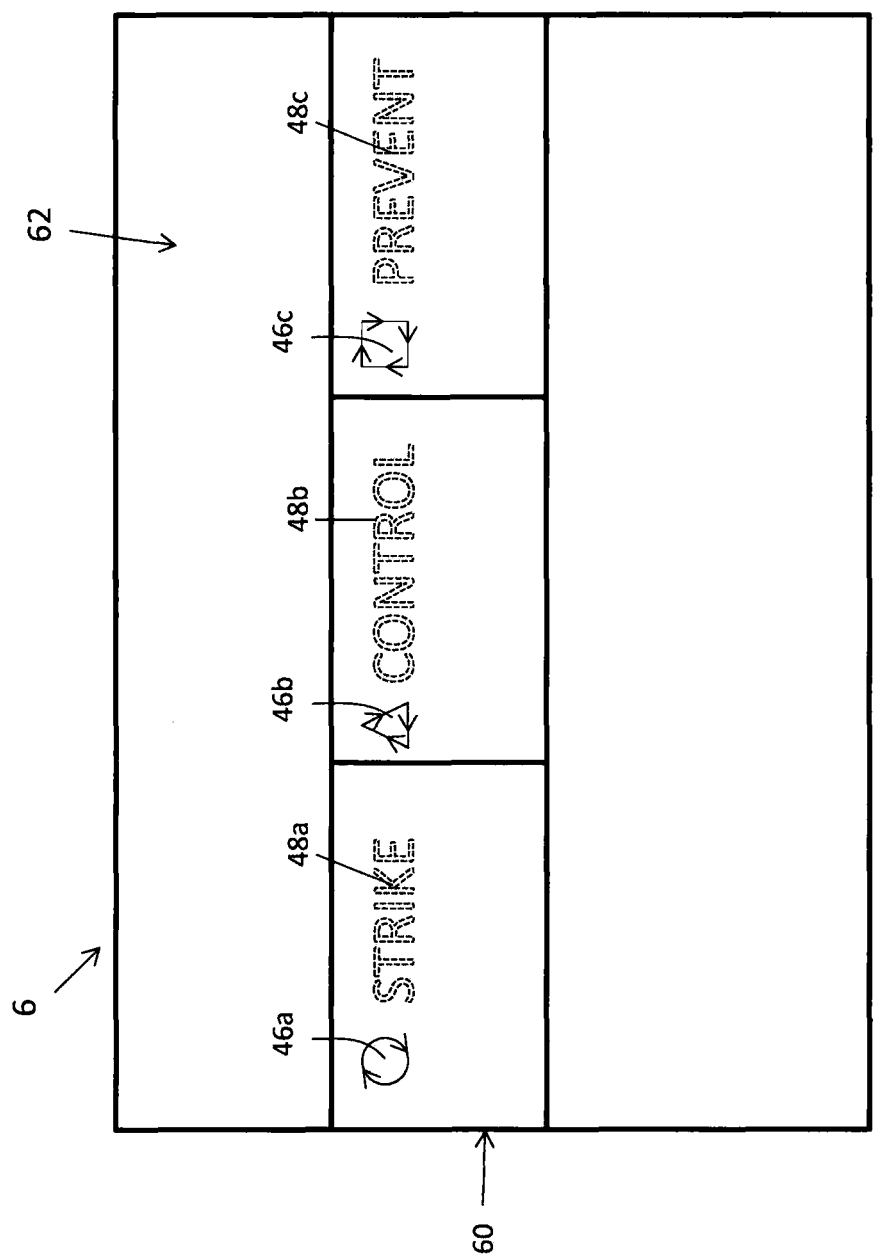
FIG. 4A is a rear elevational view of one of the consumer products of FIGS. 1A-3A having a key disposed on a surface thereof.

"Regimen" as used herein, refers to at least two distinct consumer products that are used together during an activity or task engaged in by a user of those products to accomplish a desired outcome or to enhance a desired outcome of the activity or task. Each consumer product comprises a distinct article that has its own functional and utilitarian benefit in connection with the activity independent of the other consumer products or distinct articles, regardless of whether a user could use the two or more products together to accomplish their functional and utilitarian attributes. However, the effect of the consumer products when used in combination is a heightened consumer experience beyond the effect of using the products individually.

"Activity" or "task" as used herein, refers to an event or set of events that a consumer performs using a consumer product. An activity may comprise any number of events, of which several non-limiting examples are cleaning, fragrancing the home, and managing pests. In one particular example, the tasks of a pest management regimen comprise attacking, controlling, and preventing pests such as insects. For purposes of discussion, "attacking" may be effected by an aerosol and may kill or otherwise knockdown bugs. "Controlling" may be accomplished by a product directed to a surface or other substrate that works over a period of time. "Preventing" may be effected through utilization of pest traps or baits.

"Consumer," as used herein, refers to any person or entity that may purchase a consumer product or a stream of products or otherwise use a product or a stream of products. The consumer may also be the end user of the consumer products.

"Consumer Product" as used herein, refers to a distinct article that provides a functional and utilitarian benefit, of which several non-limiting examples include insect repellants, insecticides, air fresheners, all-purpose cleaners, carpet cleaners, window cleaners, candles, floor cleaners, furniture polishes, disinfecting wipes, detergents, car polishes, and the like.

"Key" as used herein, relates to a guide, whether provided in printed form on a consumer product or package containing a consumer product, or in digital form, such as on a computer, kiosk, hand-held device, etc., that identifies at least two consumer products that are associated with one another in a regimen. The identification utilizes all or a portion of the visual cues associated with each of the consumer products that comprises the regimen.

"Visual cue" as used herein, relates to a means for communicating some form of information to a consumer via a pattern, shape, color, texture, graphic, and/or combinations thereof.

"Visual cue system" as used herein, relates to two or more visual cues provided on two or more distinct consumer products or consumer product packages within a regimen that provide an indication to the user that the consumer products can be used in combination to heighten the effect of the consumer's experience using the products beyond the effect of using the products individually.

Now generally referring to FIGS. 1-3, a plurality of consumer products with packaging 2, 4, 6 are depicted. The consumer products are designed to hold unique treatment materials 8 with respect to each other. The first package 2 shown in FIG. 1 includes a manual aerosol container 10 having treatment material 8 disposed therein. In another embodiment, an automatic actuator may be utilized in lieu of and/or in conjunction with the manual actuator.

As shown in FIG. 2, the second package 4 includes a container 20 with a sprayer head 22 mounted thereon. The treatment material 8 is disposed within the container 20 and the sprayer head 22 acts to seal the treatment material 8 therein and to provide a dispensing mechanism to release the treatment material 8. The sprayer head 22 generally includes a body 24 with a manually actuated trigger 26 and a nozzle 28 with an outlet orifice (not shown).

FIG. 3 depicts the third package 6, which is provided in the form of a substantially rectangular box 30. The box 30 includes the treatment material 8 therein. In one embodiment, the box 30 may be punctured or otherwise opened to allow access to the treatment material 8. The treatment material 8 may be provided in various forms within the box 30. For example, in one embodiment, the treatment material 8 may be provided as pellets that include an insecticide. In another embodiment, the treatment material 8 is provided as pest traps or baits.

Although depicted as containers 10, 20, and box 30 in FIGS. 1-3, respectively, the packaging 2, 4, 6 may comprise other forms as known in the art. For example, the packaging may be provided in the form of a bag, a cleaning instrument (e.g., a mop), and the like. The packaging may be made of any material including, for example, plastic, metal, fabric, and other similar materials.

The treatment material 8 utilized in the first, second, and/or third package 2, 4, 6 may be provided in numerous forms. For example, the treatment material 8 may be provided as a solid, liquid, and/or gas. In one embodiment, the treatment material 8 disclosed in the embodiments herein may be an insect repellant or insecticide disposed within a carrier liquid, a solvent, a fragranced liquid, or the like. The treatment material 8 may also comprise other actives, such as sanitizers, air fresheners, odor eliminators, mold or mildew inhibitors, and the like, and/or that have aromatherapeutic properties. In one specific embodiment, the treatment material 8 is provided as cleaning capsules designed to be utilized in water.

Still referring to FIGS. 1-3, the consumer product packages 2, 4, 6 collectively define a regimen, in which the packages are designed to be utilized in conjunction with one another. Specifically, the consumer product packages 2, 4, 6 each include indicia that provide a visual cue that indicates that the packages 2, 4, 6 are associated with each other and/or can be used in a specific regimen. In particular, a visual cue is disposed on a surface of each of the packages 2, 4, 6. Preferably, the visual cue is disposed on a surface facing a consumer at the point of purchase, e.g., a front surface visible from a store shelf. Turning to FIG. 1, the package 2 includes a first visual cue 44a. In the present embodiment, the visual cue 44a is provided with a clearly delineated boundary; however, in other embodiments the visual cue 44a may not be so constrained, but rather may generally indicate an area for the placement of other elements as will be described. With reference again to FIG. 1, the visual cue 44a includes a symbol 46a, which in the present embodiment is generally depicted as a circle. However, it is envisioned that any number of symbols or indicia may be used as a marker or indicator for consumers to associate with the particular consumer product and/or package. Further, the visual cue 44a includes text 48a, which provides a written indication of a quality or attribute of the consumer product or package that may be associated therewith and with the symbol 46a. In other embodiments, the text may be omitted altogether and the regimen may rely solely on the communicative attributes of the provided symbol 46a.

Turning now to FIGS. 2 and 3 the packages 4 and 6 are also provided with visual cues 44b and 44c, respectively. It is preferred that the symbols 46b and 46c utilized with the visual cues 44b and 44c are different from one another as well as the symbol 46a of the visual cue 44a. In the present embodiment, the symbol 46b is represented by a triangle and the symbol 46c is represented by a square. However, the particular symbol may be illustrated in any number of ways, including other geometric shapes, insofar as they are differentiable from one another to communicate the fact that the packages 2, 4, 6 are different from one another.

Preferably one or more of the visual cues 44a-44c, the symbols 46a-46c, and the text 48a-48c, is provided with a coloration that is in contrast to the surrounding color of the respective package 2, 4, 6.

With reference to FIGS. 1A-3A, an alternative embodiment to the packages 2, 4, 6 is shown that is identical to the packages of FIGS. 1-3 except for the inclusion of arrows on the symbols 46a-46c. The arrows are illustrative of the possible use of a drafting, geometric, or pictoral element that may be provided on all the symbols 46a-46c of a regimen to provide an additional visual linkage between the visual cues 44a-44c. Any number of supplementary elements may be provided on, within, adjacent to, or otherwise in connection with the provided symbols 46a-46c to assist the user in visualizing the connection of the packages 2, 4, 6 into one regimen. It is further envisioned that color may used to effect this outcome alone or in combination with any of the aforementioned elements. Further, the font and/or size of the text 48a-48c may also be modified to effect this outcome.

FIGS. 4 and 4A depict a regimen key 60 for the visual cue system of FIGS. 1-3 and FIGS. 1A-3A, respectively, that is provided on the consumer product package 6. Preferably, the key 60 is provided on all of the packages 2, 4, 6 of a particular regimen, or is otherwise visible to the consumer at the point of sale, such as with an in-store display, or digitally if the point of sale is on-line. While the sizing and placement may vary, the content is generally similar if not identical to provide a means for a consumer to interpret or understand the visual cue system, thereby allowing the consumer to easily identify affiliated consumer products associated with the regimen. The particular type of product may be highlighted on the key affixed to the product, for example, by showing the corresponding portion of the key in a different color. In the embodiment depicted, the key 60 is disposed on a rear surface 62 of the package 6 and includes each of the symbols 46a-46c and text 48a-48c of the associated consumer products in the regimen. In the embodiment depicted, all three of the symbols 46a-46c and text 48a-48c are shown. In another embodiment, one or more of the symbols 46a-46c and/or text 48a-48c may be omitted.

In use, a consumer may approach a particular consumer product package, e.g., package 6, and take the product off of a shelf for eventual purchase. In doing so, a front surface of the package 6 depicts the text 48c "Prevent" adjacent to a symbol 46c (see FIGS. 3 and 3A). Upon turning the package 6 over, the key 60 is visible, which provides the same symbol 46c and similar or identical text 48c in association with one or more other symbols and/or text, e.g., 46a-46b and 48a-48b. The provision of the key 60 provides a signal or notification to the consumer that the package 6 is but one component of a regimen of products, e.g., packages 2, 4 and 6, that may be used safely together to effect a heightened consumer experience. More particularly, the consumer is provided with information on what other products they may desire to use, which in some instances they may not have been aware of, are provided with notice that other products are efficacious in combination with the product already chosen, are provided with notice that the use of the regimen of products is safe, and/or are otherwise provided with information on how to manage a particular aspect of their life, e.g., how to manage pests within a home. Thereafter, a consumer may review the key 60 and locate other products and/or packages of the regimen having the associated symbols and/or text. An intuitive and easy to use method of managing various consumer needs is therefore presented.

Various combinations of the symbols 46a-46c, text 48a-48c, and/or other elements of the visual cues 44a-44c may be used to convey information to the consumer regarding use of the consumer products in a suggested regimen. Other stylistic elements of the visual cues 44a-44c may also impart regimen information. For example, in one embodiment, the use of similarly sized symbols 46a-46c with text 48a-48c that uses a font in a contrasting color visually connotes that the consumer products may be used together in a regimen. In other embodiments described more hereinbelow, geometric similarities alone, or in combination with symbols, text, or other stylistic elements, e.g., color, font type, font size, spacing of the text and/or additional symbols within the visual cues, similarity of symbols, etc., impart regimen information to the consumer.

Now generally referring to FIGS. 5-7, a plurality of consumer products with packaging 102, 104, 106 are depicted. The consumer products depicted in FIGS. 5-7 are similar to those depicted in FIGS. 1-3 and 1A-3A and use like numbering, except for the differences discussed below. In particular, a different visual cue system is used with the consumer products shown in FIGS. 5-7.

As best seen in FIGS. 8A-8C, a different embodiment of a visual cue system 150 is associated with the plurality of consumer products. In the present embodiment, the system 150 includes first, second, and third substantially rectilinear visual cues 152, 154, 156. Each visual cue 152, 154, 156 includes a unitary symbol that is divided into a plurality of sections 152a-152c, 154a-154c, 156a-156c, respectively, via horizontal lines. In the embodiment depicted, the sections 152a-156c are each defined by a rectangle and represent a stage in a regimen for completing a task or activity. In the present embodiment, each visual cue 152, 154, 156 is divided into three sections 152a-156c, respectively. However, it is contemplated that in other embodiments the symbol may be divided into greater or fewer sections depending on the number of stages in the regimen.

In the embodiment shown, each section 152a-156c of the visual cue 152, 154, 156 is similar in shape to the other sections 152a-156c; however, at least one section is enlarged with respect to the other sections to indicate to a user a specific stage in the regimen. For example, as shown in FIG. 8A, the first visual cue 152 includes the large upper section 152a, representing a first stage in a regimen. In the second cue 154 shown in FIG. 8B, the middle section 154b is larger than the other two sections 154a, 154c, which represents to a consumer another stage in the regimen. In the third cue shown in FIG. 8C, the bottom most section 156c is larger than the other sections 156a, 156b and represents still another stage in the regimen. In the embodiments shown in FIGS. 8A-8C, it is contemplated that the first visual cue 152 represents a consumer product designed to be utilized first in the regimen, the second visual cue 154 represents a consumer product designed to be utilized second in the regimen, and the third visual cue 156 represents a consumer product designed to be utilized third in the regimen.

Alternatively, the embodiment shown in FIGS. 8A-8C conveys to the consumer that the three consumer products provided with the first, second, and third visual cues 152, 154, 156 may be used in conjunction with each other with a particular regimen regardless of the order in which they are used. In a further embodiment, the visual cues 152, 154, 156 indicate a synergistic effect with respect to each other to accomplish a specific regimen as described in more detail hereinbelow. In a further example, use of the visual cues 152, 154, 156 conveys that the consumer products associated therewith are designed to be utilized to accomplish specific tasks as part of an overall regimen (e.g., ridding different areas of the home of bacteria, fragrancing different types of rooms of a house, etc).

Although the first visual cue system is shown to include visual cues having one section larger than the others to indicate a stage in a regimen, as shown in FIGS. 8A-8C, it is contemplated that rather than making a section larger, a second visual cue system 160 may have a different color or pattern than the other sections as shown in FIGS. 9A-9C. Alternatively, as shown in FIGS. 10A-10C, a third visual cue system 162 includes contrasting colors or patterns in addition to the larger size of the relevant section to further accentuate association with the regimen.

In a further embodiment shown in FIGS. 11A-11C, another visual cue system 164 is depicted that illustrates the use of other geometric shapes. In particular, in the embodiment depicted a series of stacked chevrons are used in the visual cue system 164 consistent with the disclosure herein. A first visual cue 166 includes sections 166a-166c, of which the upper most section 166a is enlarged. A second visual cue 168 includes sections 168a-168c, of which the middle section 168b is enlarged. Finally, a third visual cue 170 includes sections 170a-170c, in which the lower most section 170c is enlarged. Each of the visual cues 166, 168, 170 are provided on, or otherwise associated with, a consumer product or package containing a consumer product that are different from one another.

Figure 11D:
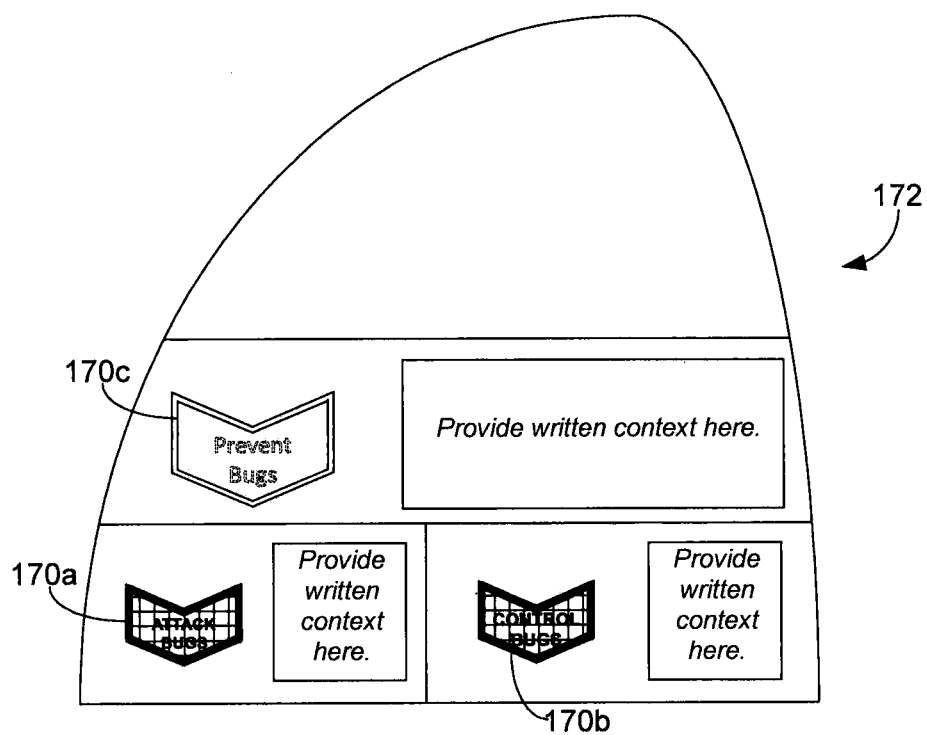
FIG. 11D illustrates a key for placement on a consumer product that utilizes one of the visual cue system of FIGS. 11A-11C.

Turning to FIG. 11D, a key 172 is provided that is associated with the visual cue system 164. Specifically, the key 172 is provided on a package of a consumer product that utilizes the triple stacked chevron of FIG. 11C, of which the section 170c is enlarged in comparison to the other sections 170a, 170b. Further, it is preferred that the enlarged section 170c includes a coloration different than that of the remaining sections 170a, 170b, e.g., yellow and black. With reference again to FIG. 11D, the enlarged section 170c is represented as a single chevron with similar coloration and text as that shown in the visual cue 170. Further, other consumer products associated with the present consumer product are identified within the key 172 and represent a regimen of consumer products that may be used together. In the present embodiment, consumer products associated with the chevrons 170 for "attacking" bugs and the chevron 170b for "controlling" bugs are indicated. The key 172 preferably illustrates the chevrons 170a, 170b in a manner that depicts them as smaller than the chevron 170c and/or that has a different coloration than the chevron 170c. Further, it is also preferred that written content be provided on the key 172 to educate consumers on the types of products that will work together within the identified regimen.

Additionally, the visual cue systems 150, 160, 162, 164 may also include text and/or symbols to provide additional indication to a user of the specific use of the consumer product or association with a particular regimen. Further, any of the visual cue systems 150, 160, 162, 164 may be similarly provided with a key. It will be assumed for purposes of the present disclosure that the discussion of the operation of the visual cue systems of the present embodiments may be supplemented with the disclosure of the embodiments of FIGS. 1-4A.

Turning again to FIGS. 5-7, the visual cue system 150 is designed to be affixed or otherwise associated with each of the product packages 102, 104, 106. In particular, the first visual cue 152 is associated with a container 10 of the first product package 102. The second visual cue 154 is associated with a container 20 of the second product package 104. The third visual cue 156 is associated with a box 30 of the third product package 106. In the embodiment shown, the visual cues 152, 154, 156 are associated with a front surface of each of the product packages 102, 104, 106. In another embodiment, the visual cues 152, 154, 156 are associated with another surface of the product packages 102, 104, 106. In other embodiments, the visual cues 152, 154, 156 may be associated with one or more surfaces of the product packages 102, 104, 106. For example, the visual cue 152 may be associated with the front surface of the product package 102 while the visual cue 156 may be associated with an upper surface of the product package 106 to provide a clearer view of the cue to the consumer, if for instance, the product package 106 is designed to be located adjacent the floor.

The visual cues 152, 154, 156 may be associated with the product packages 102, 104, 106 in manners known in the art. For example, in one embodiment, the cues 152, 154, 156 are included with the product packages 102, 104, 106 as part of a pre-printed label. In another embodiment, the cues 152, 154, 156 may include adhesive or another affixing material on an interior side thereof that is designed to be affixed to the product packages 102, 104, 106 after the manufacturing and/or distribution process. In other instances, the cues 152, 154, 156 are affixed to or otherwise associated with the product packages 102, 104, 106 in manners known in the art.

Referring again to FIGS. 5-7, a first regimen comprising a stream of consumer products used in combination to complete a task is illustrated that incorporates the first visual cue system 150. The first visual cue 152 is attached to the first product package 102. The first consumer product is configured to complete the stage of the regimen indicated by the visual cue 152, i.e., the first stage. The second visual cue 154 is attached to the second product package 104 and is used to perform another stage of the regimen. The third visual cue 156 is attached to the third product package 106 and is designed to perform a still further stage of the regimen. Based on the three enlarged sections 152a, 154b, 156c of the visual cues 152, 154, 156, the consumer is able to understand that the consumer products may be used in a three stage regimen. Additionally, the similarity between the visual cues 152, 154, 156 works as an indicator to inform the consumers that it is recommended to use the consumer products together. Still further, the visual cues 152, 154, 156 help consumers overcome a fear of mixing various chemicals by allowing the consumer to understand that the products are safe to be used together.

In one non-limiting example, the regimen may be for controlling pests. In this example, the first visual cue 152 is attached to the consumer product package 102 containing a treatment material 8 designed to attack bugs, the second visual cue 154 is attached to the consumer product package 104 having a treatment material 8 designed to control bugs, and the third visual cue 156 is attached to the product package 106 having a treatment material 8 designed to prevent bugs. In this embodiment, the first, second, and third products 102, 104, 106 each include a treatment material 8 that is different with respect to each other.

In further embodiments, a secondary visual cue system is provided in conjunction with the first visual cue system 150. In one particular embodiment, the secondary visual cue system includes patterned graphics to represent a particular regimen. In particular, the graphics are provided on associated consumer products to create an additional visual element used in conjunction with the associated repeating geometric shapes to create a visual link between two or more consumer products. For example, the embodiments shown in FIGS. 12A-12C represent the use of the first visual cue system 150, i.e., enlarged rectilinear boxes 174, 176, 178, with patterned graphics 174a, 176b, 178c, respectively. In the embodiment depicted in FIGS. 12A-12C, the first visual cue system 150 is used with the patterned graphics 174a, 176b, 178c to represent a cleaning regimen for specific areas of the home. In particular, the graphics 174a, 176b, 178c represent the appropriate product to clean a bathroom, a kitchen, and a car, respectively. In some instances, the secondary visual cue system is a contrasting color with adjacent elements as shown in FIGS. 10A-10C. The contrasting color is provided as a light color adjacent one or more dark colors. In the embodiment shown, the upper most section of the first visual cue is a dark color (e.g., black). The two adjacent sections of the first visual cue are light colors (e.g., white or yellow). Similarly, the upper most section and the lower most section of the second visual cue are light colors while the middle section is a dark color. Further, the third visual cue includes the upper two sections having a light color while the lower most section is defined by a dark color. It is contemplated that the order of the colors may be altered consistent with the disclosure herein, but that contrasting and uniform color patterns are used to enable the consumer to associate the products with the affiliated regimen.

In one specific embodiment, the dark color utilized in the visual cue systems described herein is black. In another embodiment, the dark color utilized in the visual cue systems is navy. In a further embodiment, the dark color utilized in the visual cue systems is dark grey. In a further embodiment, the light color utilized in the visual cue systems described herein is white. In another embodiment, the light color utilized in the visual cue systems described herein is yellow. In one specific embodiment, the dark color utilized is black and the light color utilized is yellow.

It should be appreciated that the regimen examples provided herein are non-limiting and that other consumer products may be substituted where appropriate and consistent with the description herein. Further, any of the disclosure in connection with one of the embodiments may be used in connection with other embodiments, e.g., the key 60 of FIGS. 1-4A may be used in connection with the subsequent embodiments described herein. Additionally, one or more steps may be removed or added to the regimens. It is also contemplated that the consumer products discussed herein provide a benefit when used singularly, but have a synergistic or holistic effect when at least two consumer products are used in conjunction with each other. The consumer products may be designed to be used at the same time (i.e., one product in the bathroom and one product in the kitchen) and/or may be designed to be used in a sequence (i.e., one product over a first time period followed by a second product over a second time period). For example, the first consumer product may be used in the kitchen for a first time period (e.g., between about 1 day to about 14 days). The second consumer product may be used in the kitchen for a second time period following the first time period.

Figure 13:
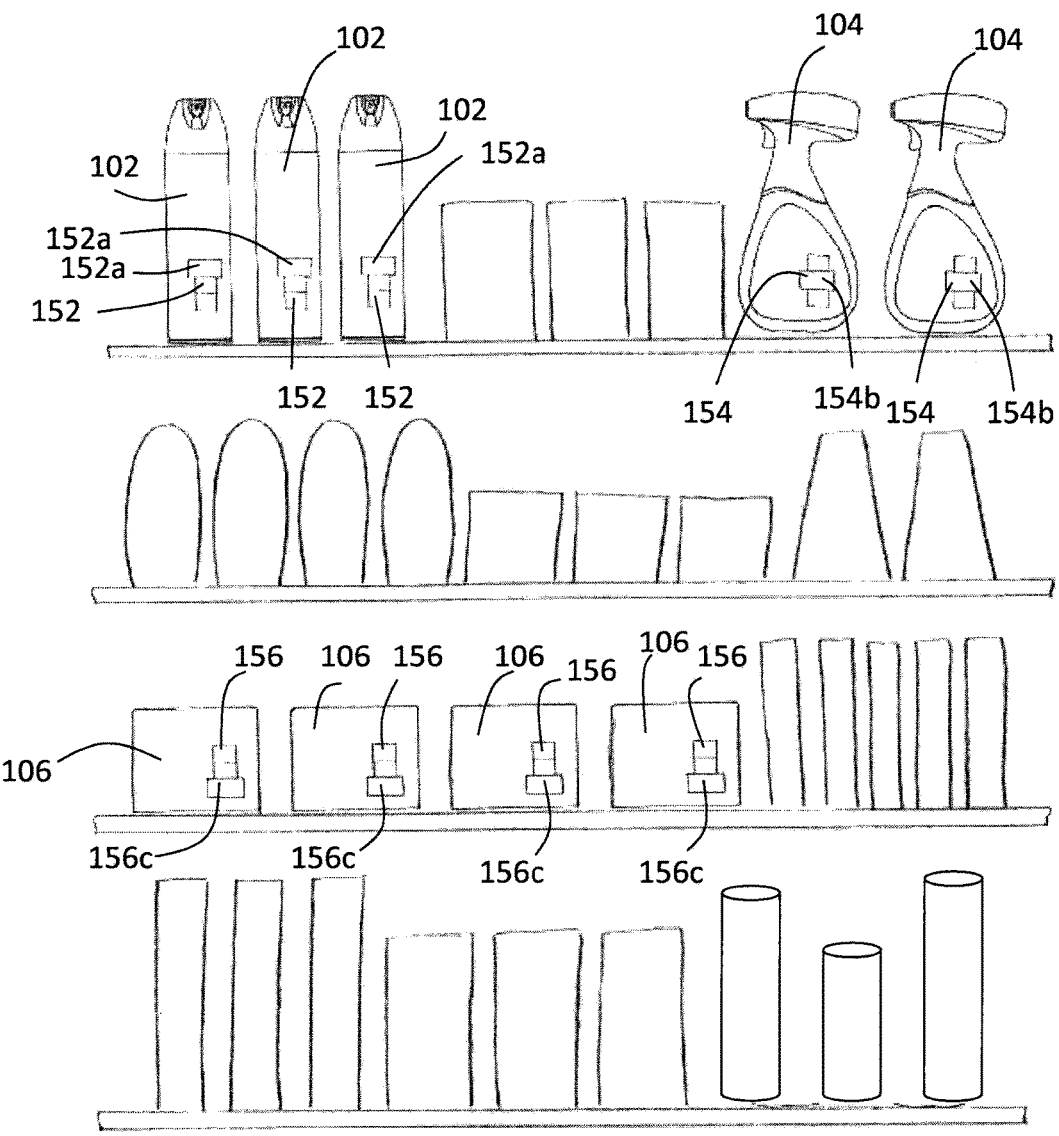
FIG. 13 is a front elevational view of a store shelving system holding the regimen of consumer products of FIGS. 5-7.

Referring now to FIGS. 13 and 14, the first, second, and third consumer products of the regimen are typically sold in stores on different sections of shelves and/or in other aisles (see FIG. 14), and are often separated by other consumer products. As shown in FIG. 13, the first, second, and third visual cues 152, 154, 156 are located on first, second, and third consumer product packages 102, 104, 106, respectively. The first, second, and third consumer products are sold in stores on the same or different shelves. In use, a consumer walks into a store and locates one of the first, second, and third consumer products. In this example, the consumer locates the first consumer product with packaging 102 having the first visual cue 152 disposed thereon. The first visual cue 152 provides an indication to the user that the first consumer product is part of a product regimen by way of the enlarged section 152a. The consumer is able to scan the shelves for another consumer product having a visual cue thereon. The consumer locates the second visual cue 154 disposed on the second consumer product packaging 104 and is provided additional information via the enlarged section 154b. An additional scan of the shelves allows the consumer to quickly locate the third visual cue 156 disposed on the third consumer product packaging 106 and is provided with additional information via the enlarged section 156c. As illustrated in this example, the visual cue system allows a consumer to quickly locate all of the consumer products in a regimen, even if the consumer products are located on different shelves or different areas of the same shelf.

Similarly, in the embodiment depicted in FIG. 14, a plurality of consumer products are disposed within a store. In this embodiment, the first consumer product with packaging 102 having the first visual cue 152 is disposed on one side of an aisle 180, whereas the second consumer product packaging 104 with the second visual cue 154 is disposed on the opposing side of the aisle 180. The third consumer product with packaging 106 includes the third visual cue 156 and is disposed on an endcap of an aisle. Similar to the previous embodiment, the visual cue system 150 allows a consumer to easily identify products associated with the regimen.

FIGS. 13 and 14 are similarly illustrative of how the visual cues 44a-44c of FIGS. 1-4A may be utilized. However, in this embodiment, the consumer associates a symbol and/or text on a surface of the package with a key thereon to identify further products or packages of a particular regimen before finding them on a store shelf. Similarly, the process a consumer steps through to identify the products and packages as described in connection with FIGS. 13 and 14 may be supplemented with a key to further assist the consumer.

It is contemplated that more than one regimen may be present in a given store. In this embodiment, the regimen may be identified via color, texture, patterns, graphics, and/or using the methods discussed herein. For example, in one embodiment, the pest control regimen discussed herein may be identified using the visual cue system 150, while the surface treating regimen discussed herein may be identified using the visual cue system 160. Any of the regimens discussed herein may utilize any of the visual cue systems discussed herein to assist consumers in identifying and associating consumer products with the appropriate regimen.

As previously noted, the visual cue system 150 herein is generally illustrated by varying the size of identical geometric shapes. More particularly, it has been found that one section of the first visual cue 152 includes a length dimension of between about 2 cm to about 5 cm and a height dimension of between about 1 cm to about 3 cm. An adjacent section of the first visual cue 152 includes a length dimension of between about 1 cm to about 2 cm and a height dimension of between about 0.25 cm to about 1.5 cm. The ratio of the size of the contrasting adjacent geometric patterns is useful in allowing a consumer to identify consumer products affiliated with a regimen. In particular, the ratio of the size of the large geometric pattern to the small geometric pattern is at least about 1.25 to about 1. In other embodiments, the ratio of the size between the large and small geometric patterns is at least about 1.5 to about 1. In other embodiments, the ratio of the size of the large geometric pattern to the small geometric pattern is greater than about 2 to about 1.

The exemplary embodiments disclosed herein are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

For example, as shown in FIGS. 15A-15D the visual cue system may include first, second, third, and fourth visual cues 200, 202, 204, 206, each having first, second, third, and fourth sections, whereby the enlarged sections 200a, 202b, 204c, 206d are stage indicators. Other visual cue systems may include even more sections depending on the number of stages in a regimen. Further, the visual cues may have a different shape than rectangular. As shown in FIGS. 16A-16C, the visual cues may be circular and each section may be pie-shaped. Alternatively, the visual cues or sections of the visual cues may comprise any geometric shape known to those skilled in the art, including triangles, ovals, chevrons, squares, hexagons, and the like.

Figure 17:
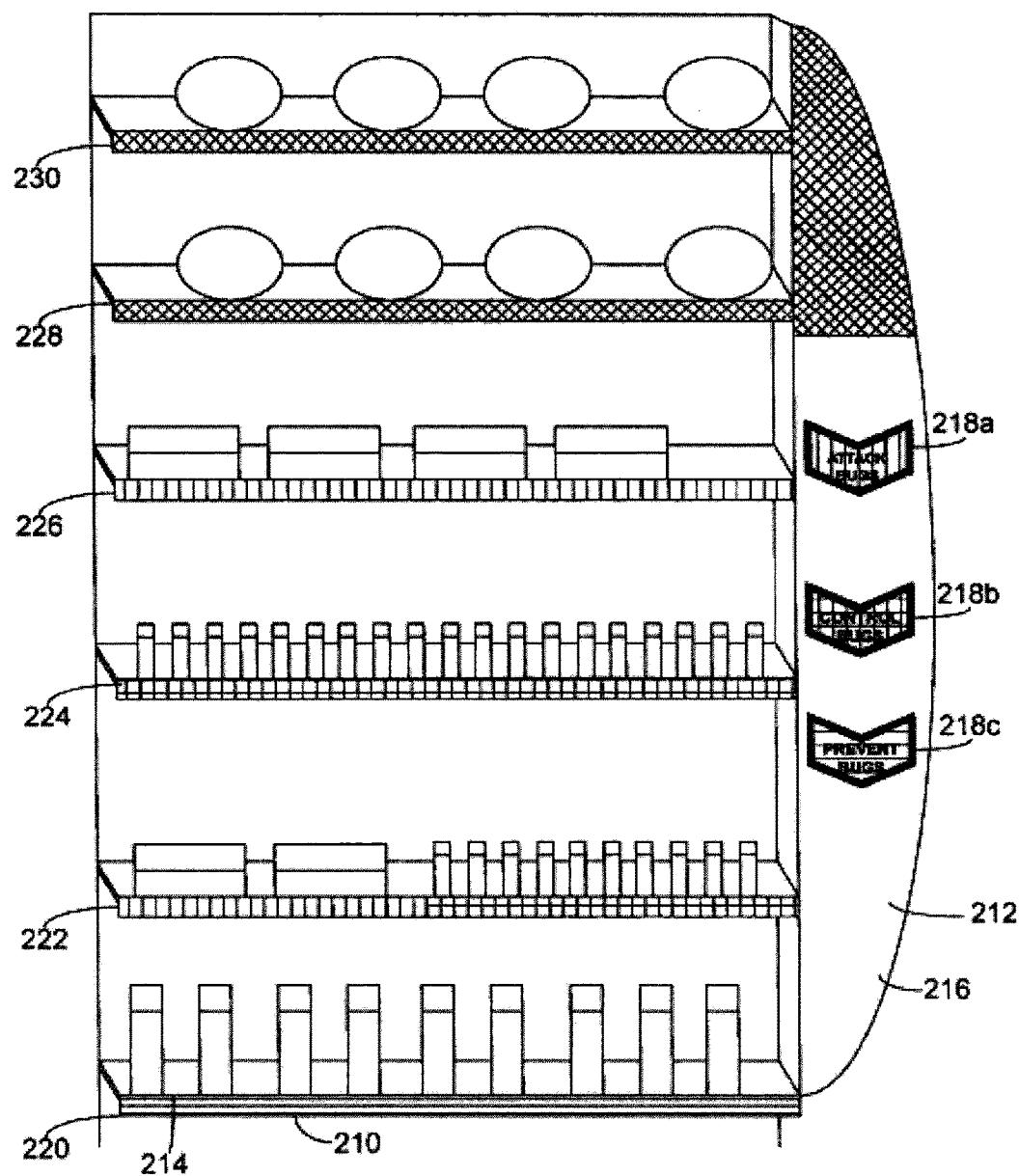
FIG. 17 illustrates a perspective view of a shelving display that includes an extender with visual cues thereon, which are associated with portions of the shelves.

It is also envisioned that any of the present embodiments may be used in conjunction with a novel shelving system. In some embodiments, the visual cue system may be displayed using an existing shelving configuration. For example, with reference to FIG. 17, a conventional six shelf display 210 that may be found in a common store has been modified. More particularly, an extender 212 is provided that extends beyond an outer edge 214 of the shelves to enhance the visibility to a consumer. The extender includes a surface 216 that is treated with various text and graphics. It is anticipated that either the single surface 216 is treated or an opposing surface may be as well (not shown). Generally, the surface 216 is provided with any one of the visual cue systems previously identified herein. In one particular embodiment, three discrete sections of a visual cue system are separated and visually portrayed on the surface 216. The discrete sections may comprise any similar geometric shape or different symbol as previously noted. However, each of the discrete sections are provided with individualized coloration to differentiate themselves from each other beyond any text that is provided thereon.

In other embodiments, the shelving system may be provided as a stand-alone display unit (not shown) that includes one or more of the plurality of consumer products that utilize one of the visual cue systems disclosed herein. The stand-alone display unit may be provided as a kit having the plurality of consumer products disposed therein and/or grouped by the visual cue system. For example, consumer products with packaging 102 having the first visual cue 152 may be disposed in one section of the stand-alone display unit, whereas the second consumer product packaging 104 with the second visual cue 154 may be disposed in a different section of the stand-alone display unit. Additional consumer products that are part of the regimen may also be included in the display unit. Further, the key may be included on a portion of the stand-alone display unit.

Specifically, the present embodiment utilizes three spaced chevrons, 218a, 218b, 218c, which are provided with the text "Attack Bugs," "Control Bugs," and "Prevent Bugs," respectively. The chevrons 218a, 218b, 218c are also provided with individualized coloration, which in the present embodiment comprises red, yellow, and blue, respectively. Similarly, the outer edge 214 of the shelves are also provided with coloration that matches with the coloration of one or more of the chevrons 218a, 218b, 218c. For example, the lower shelf 220 includes a blue outer edge, which indicates to a consumer that a consumer product for preventing bugs is provided on the shelf. On the second shelf 222, portions of the outer edge are yellow and other portions are red, illustrating to a consumer that the products above the yellow portion are for controlling bugs and the products above the red portion are for attacking bugs. Further, the third shelf 224 includes a yellow outer edge and the fourth shelf 226 a red outer edge, similarly indicating separate shelves with consumer products for controlling and attacking bugs, respectively. Such a visual communication system allows for consumers to readily identify particular products at the point of purchase and ties all of them together in a particular regimen with all of the previously identified benefits as discussed in connection with the other visual cue systems. It is also contemplated that text may be provided on the colored outer edges. Further, additional colors may be provided in addition to the colors of the regimen to indicate products that consumers may also wish to purchase. For example, the upper two shelves 228, 230 of the display 210 include an orange outer edge that is the same color as the upper portion of the extender 212. The upper portion of the extender may be further provided with text indicating a particular type of product, e.g., the text could indicate that the product may be used to protect against mosquitoes. It is anticipated that modifications may be made to the presently described system and that it may be used in conjunction with any of the aforementioned visual cue systems.

It is also contemplated that any indication throughout the present disclosure that a visual cue, symbol, or key is provided on a consumer product is also a disclosure of its alternative placement on a package containing the consumer product. Likewise, any disclosure of a visual cue, symbol, or key on a consumer product or package therefore should also be considered a disclosure of the placement of such visual cue, symbol, or key on a digital rendering of the consumer product or package, or, a disclosure of the provision of such a visual cue, symbol, or key in some digital format without placement on, whether real or by digital rendering, a consumer product or package therefore.

Other embodiments of the disclosure including all the possible different and various combinations of the individual features of each of the foregoing described embodiments and examples are specifically included herein.

INDUSTRIAL APPLICABILITY

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. All patents, patent applications, and other references cited herein are incorporated herein by reference as they appear in this document in their entirety. The exclusive rights to all modifications which come within the scope of the appended claims are reserved.

We claim:

1. A visual cue system associated with a plurality of consumer product packages, comprising:
   a first visual cue having at least a first symbol and first text associated therewith and being affixed to a first consumer product package, wherein a first product therein is adapted to perform a first function;
   a second visual cue having at least a second symbol and second text associated therewith and being affixed to a second consumer product package, wherein a second product therein is adapted to perform a second, different function; and
   a regimen key disposed on at least one of the first or second consumer product packages,
   wherein the first and second consumer product packages are different.

2. The visual cue system of claim 1, wherein the first visual cue and the second visual cue are disposed on a front surface of the first and second consumer product packages, respectively.

3. The visual cue system of claim 2, wherein the regimen key is disposed on a rear surface of at least one of the first and second consumer product packages.

4. The visual cue system of claim 1, wherein the first visual cue and the second visual cue are disposed on a front surface of the first and second consumer product packages, respectively, and the regimen key is disposed on a rear surface of both of the first and the second consumer product packages.

5. The visual cue system of claim 1, wherein the first symbol and the second symbol are utilized in the regimen key.

6. The visual cue system of claim 5, wherein the first text and the second text are utilized in the regimen key.

7. The visual cue system of claim 1, wherein the regimen key includes a first graphic associated with a function of the first consumer product package.

8. The visual cue system of claim 7, wherein the regimen key includes a second graphic different than the first graphic on the regimen key that is associated with a function of the second consumer product package.

9. The visual cue system of claim 1, wherein a third visual cue having at least a third symbol and third text associated therewith is affixed to a third consumer product package, wherein a third product therein is adapted to perform a third, different function, and wherein the third consumer product package is different than the first and second consumer product packages.

10. The visual cue system of claim 9, wherein the regimen key is disposed on the first, second, and third consumer product packages.

11. A pest management regimen, comprising:
    a first consumer product package having a first product therein adapted for attacking bugs having a first visual cue thereon;
    a second consumer product package having a second product therein adapted for controlling bugs having a second visual cue thereon; and
    a third consumer product package having a third product therein adapted for preventing bugs having a third visual cue thereon, wherein the first, second, and third products are different; and wherein the first, second, and third visual cues are associated with each other visually to provide an indication that the first, second, and third consumer product packages are designed to be used together as part of the pest management regimen.

12. The pest management regimen of claim 11, wherein a regimen key is provided on at least one of the first, second, and third consumer product packages.

13. The pest management regimen of claim 12, wherein the regimen key is provided on the first, second, and third consumer product packages.

14. The pest management regimen of claim 12, wherein the first, second, and third visual cues include a first, second, and third symbol, respectively.

15. The pest management regimen of claim 14, wherein the first, second, and third visual cues further include associated text therewith.

16. The pest management regimen of claim 11, wherein the first, second, and third visual cues have first, second and third sections provided serially adjacent one another with similarly defined geometric shapes, and wherein the first section of the first visual cue, the second section of the second visual cue, and the third section of the third visual cue are larger than the other respective sections comprising the first, second, and third visual cues.

17. The pest management regimen of claim 16, wherein the first section of the first visual cue, the second section of the second visual cue, and the third section of the third visual cue are provided with a same color, which is different than the other respective sections comprising the first, second, and third visual cues.

18. A method for providing consumer product packages associated with a regimen, comprising the steps of:
providing a first consumer product package having a first visual cue disposed thereon, wherein a first product therein is adapted to perform a first function;
providing a second consumer product package having a second visual cue disposed thereon, wherein a second product therein is adapted to perform a second, different function; and
providing a regimen key on surfaces of the first and second consumer product packages illustrating at least a portion of both the first and second visual cues.

19. The method of claim 18, further including the step of providing a third consumer product package having a third visual cue disposed thereon, wherein a third product therein is adapted to perform a third, different function.

20. The method of claim 19, further including the step of providing the regimen key on surfaces of the third consumer product package illustrating at least a portion of the first, second, and third visual cues.

* * * * *